June 19, 1951 R. H. LONG 2,557,791
TRANSMISSION OPERATING MECHANISM
Filed Dec. 13, 1947 3 Sheets-Sheet 2
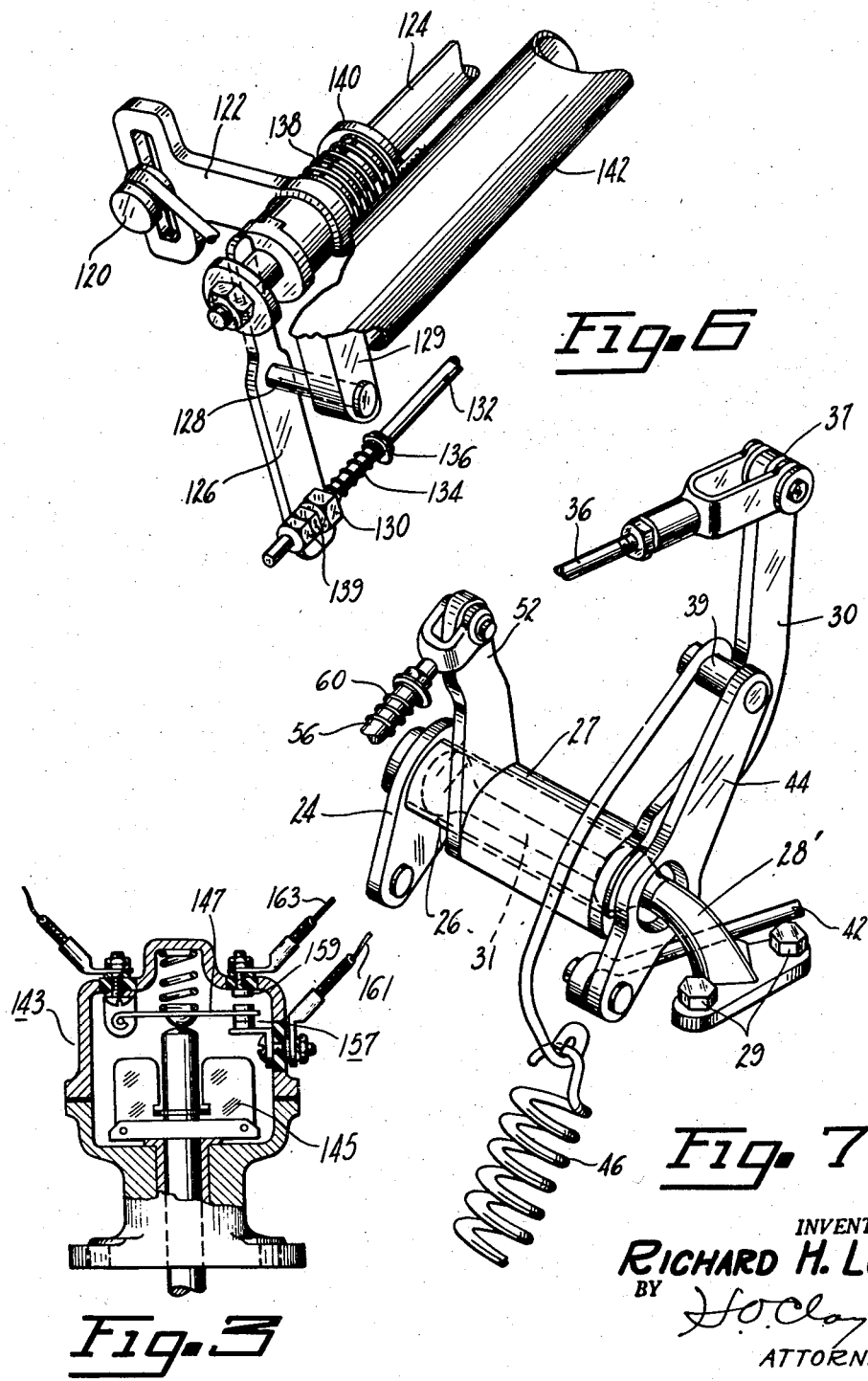
INVENTOR.
RICHARD H. LONG
BY
ATTORNEY

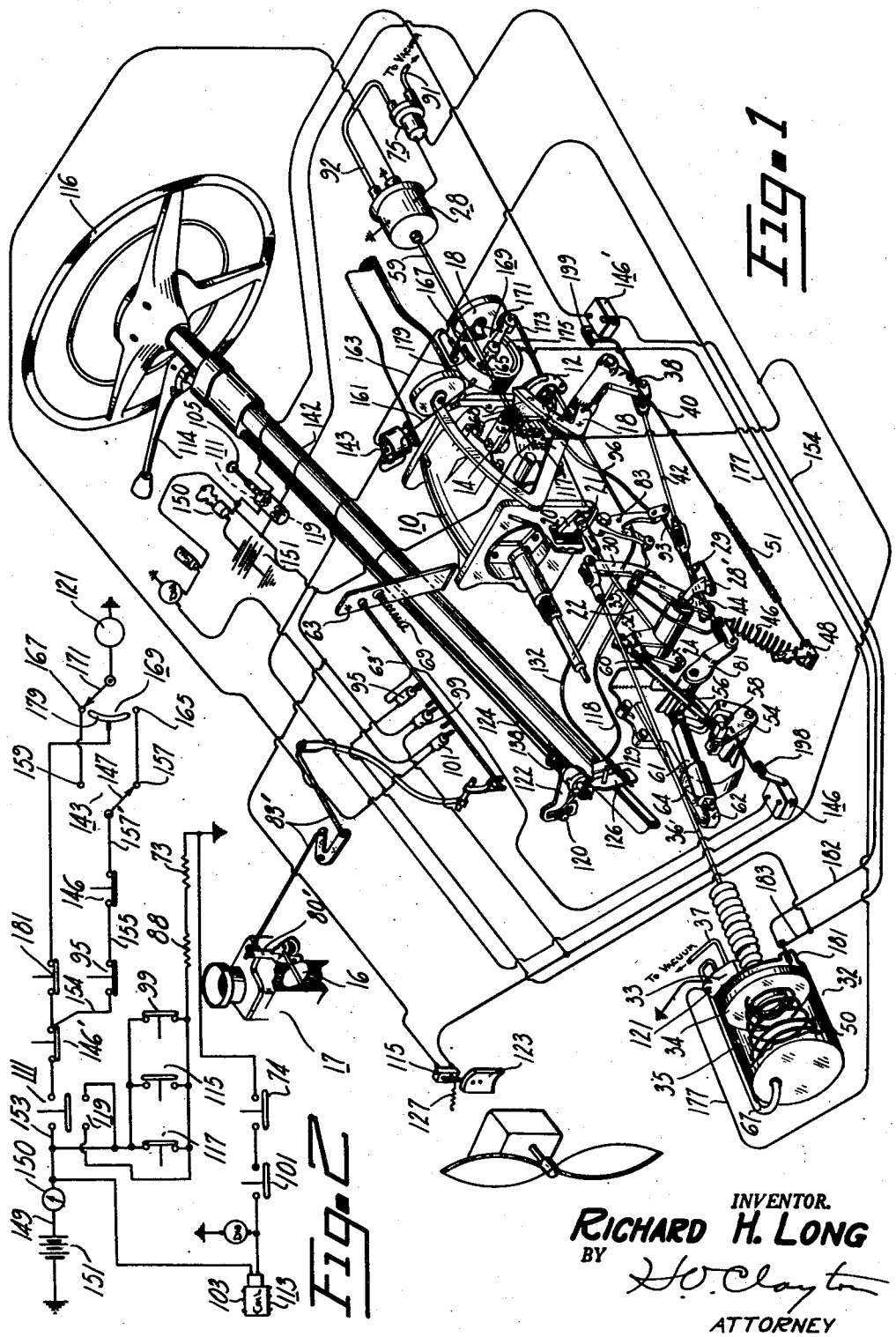

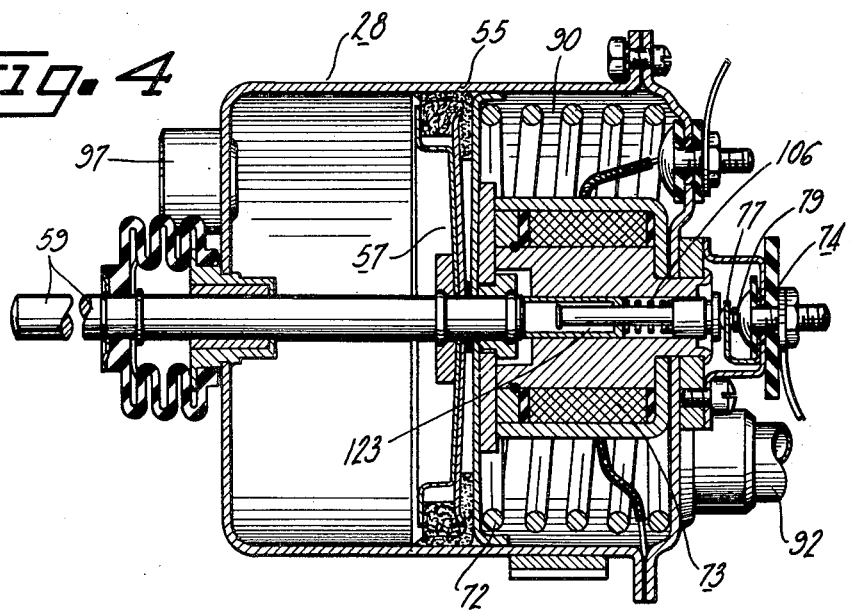
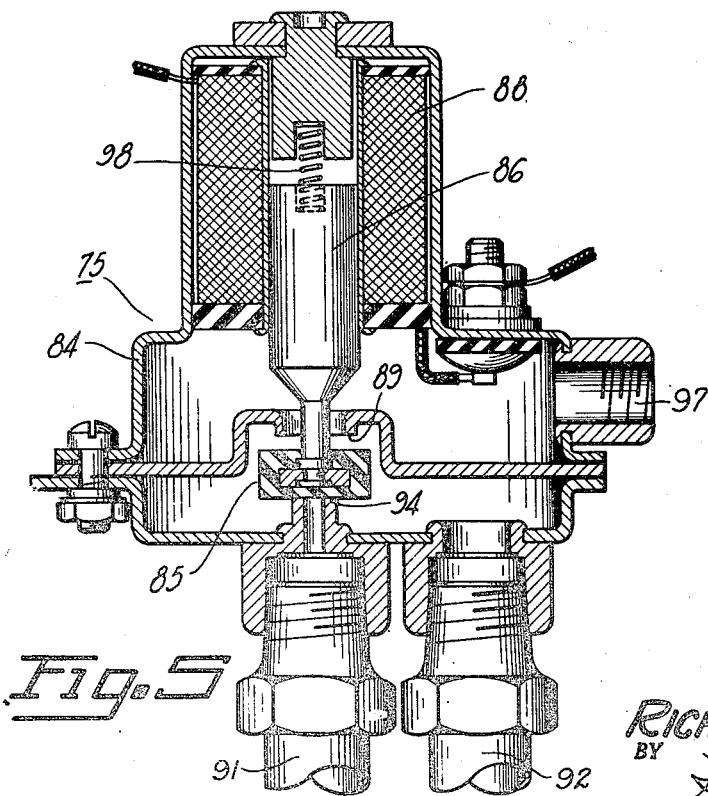

Patented June 19, 1951

2,557,791

UNITED STATES PATENT OFFICE 2,557,791

TRANSMISSION OPERATING MECHANISM

Richard H. Long, South Bend, Ind., assignor to Bendix Aviation Corporation, South Bend, Ind., a corporation of Delaware Application December 13, 1947, Serial No. 791,519

18 Claims. (Cl. 192—.073)

This invention relates in general to the power transmission mechanism of the power plant of an automotive vehicle and in particular to power and manually operated means for operating the change speed transmission of said power plant and for operating the friction clutch to facilitate the operation of the transmission.

One of the objects of my invention is to provide, in an automotive vehicle including a fluid coupling and a three speeds forward and reverse transmission, a simple mechanism, power operated in part, for operating said transmission, all of the settings thereof being effected by a manual operation of said mechanism if the driver desires to so operate the mechanism, and the second and high gear settings of the transmission being effected by power means if the driver elects this operation of the mechanism.

A further object of my invention is to provide, in an automotive vehicle including a power plant comprising a fluid coupling, an accelerator, a friction clutch, an engine controlling throttle, a three speeds forward and reverse transmission, and a gear shift lever, means for operating and for facilitating the operation of said transmission, said means including power means, comprising a single acting motor, which is automatically operable, when the clutch pedal is in its clutch engaged position and the accelerator is released, to establish the transmission either in its second gear setting or its high gear setting depending upon the speed of the vehicle, the friction clutch being operated by said motor to facilitate this operation of the transmission, said means further including manually operated means for effecting, at any time, any one of the gear settings of the transmission.

A further object of my invention is to provide, in the power plant of an automotive vehicle, a manually and power operated mechanism for operating a three speeds forward and reverse transmission and a friction clutch, said mechanism being capable of a manual operation to operate the transmission and also capable, when the accelerator and clutch pedal are released, of effecting a power operation of the transmission to alternately effect the second and high gear settings thereof depending upon the speed of the vehicle, the friction clutch being disengaged to facilitate each of said operations and automatically re-engaged after each operation is completed; and another object of my invention is to include, in such a mechanism, means for insuring a completion of the operation of the clutch and transmission once initiated and for insuring, by a recycle operation of the mechanism, the operation of the mechanism called for by a governor operated switch, said switch constituting one of the principal controls of the mechanism.

The most important object of my invention however is to improve upon the above described mechanism by the inclusion of controls, including a vacuum and spring operated kick down motor, for effecting a power operated second gear setting of the transmission when the accelerator is depressed beyond its wide open throttle position and irrespective of the speed of the vehicle, said operation of the transmission being facilitated by a momentary disabling of the ignition system of the invention to reverse the engine torque; and a further object of my invention is to provide automatically operative means for disabling the operation of the spring and vacuum operated motor under certain conditions of operation of the vehicle.

Yet another object of my invention is to provide means, preferably including a fluid pressure operated motor, for effecting a reciprocatory angular movement of a crank such as the transmission operating crank of a three speeds forward and reverse automotive transmission or a crank for operating a two speed axle of an automotive vehicle, said motor being controlled by a manually operated switch such as an accelerator operated switch of an automotive vehicle, a selector switch mechanism operated by the aforementioned motor, a vehicle speed responsive governor operated switch mechanism, another manually operated switch serving as a cutoff switch; together with power means, including a spring and vacuum operated motor, for overruling the aforementioned power means for effecting, at the will of the operator of the mechanism, an angular movement of the crank in one direction irrespective of the operation of the governor operated switch mechanism.

The above and other objects and features of the invention will appear more fully hereinafter from a consideration of the following description taken in connection with the accompanying drawings wherein one embodiment of the invention is illustrated by way of example.

Figure 1 is a diagrammatic view of my invention disclosing the principal features thereof;

Figure 2 is a wiring diagram of the electrical mechanism disclosed in Figure 1;

Figure 3 is a sectional view disclosing details of the governor operated switch mechanism of my invention;

Figure 4 is a sectional view disclosing details of the kick down spring and vacuum motor of my invention;

Figure 5 is a sectional view disclosing details of the three way valve for controlling the motor of Figure 4;

Figure 6 is a view disclosing details of the transmission operating force transmitting linkage located at the base of the steering column; and Figure 7 is a view disclosing details of a part of the linkage interconnecting the clutch pedal, the clutch, and the pressure differential motor.

Referring now to Figure 1 disclosing a preferred embodiment of my invention, a three speeds forward and reverse transmission 10, such for example as that used in one of the well known cars of the day, is operated by means of a manually operated crank 12 and a manually and power operated crank 14, the crank 12 serving to operate the shift rail selecting mechanism of the transmission and the crank 14 serving to operate that part of the transmission functioning to move the selected rail to establish the transmission in the desired gear ratio. With such a transmission the crank 14 must be moved to its transmission neutral position to neutralize the transmission before the shift rail selecting crank 12 may be operated.

My invention has to do with the manually and power operated means for actuating the aforementioned transmission operating cranks 12 and 14 and for operating a conventional friction clutch, not shown, said clutch preferably including the usual driving and driven plates forced into engagement by clutch springs. The aforementioned transmission and the clutch as well as the hereinafter referred to fluid coupling are of conventional design; accordingly, no claim is made thereto and the same are not disclosed in the drawings. The mechanism of my invention also preferably includes, in the power plant of the vehicle, a fluid coupling such for example as that which is incorporated in several 1946 passenger vehicles and said coupling preferably includes an impeller and a vaned rotor the latter serving to drive the aforementioned driving plate of the clutch.

The friction clutch, not shown, is operably connected to the clutch pedal 18 of the car by means including a crank 20 and a rod 22 pivotally connected to one end of the crank 20 at 21 and pivotally connected at its other end to a crank 24. As disclosed in Figure 7 the crank 24 is fixedly secured to one end of a cylindrically shaped shaft 26; and a cylindrically shaped shaft 27 is sleeved over the shaft 26. The latter shaft is rotatably mounted on a spindle 31 extending from the end of a support 28' which is fixedly secured in place by bolts 29. A crank 30 is fixedly connected at its lower end to one end of the shaft 27 and is pivotally connected at its upper end at 37 to one end of a rod 36; and the latter rod is connected at one of its ends to a piston 34 or a single acting pressure differential operated motor 32.

This motor 32 is controlled by a solenoid operated three way valve 33, said valve serving to connect a control compartment 35 of the motor with either a source of vacuum to energize the motor or to the atmosphere to deenergize the motor. The valve 33 may be connected to the intake manifold of the internal combustion engine of the vehicle by a conduit 37; for as is well known in the art, this manifold becomes a source of vacuum when a throttle valve 16 is closed to idle the internal combustion engine of the vehicle. A solenoid for operating the valve 33 is indicated in Figure 1 by the reference numeral 121 and said valve may be connected to the control compartment 35 by a conduit 67. No claim is made to the motor 32 and its control valve 33 inasmuch as this power means is old in the art as evidenced by many patents; i. e., U. S. Patent to Belcia No. 1,470,272, dated October 9, 1923.

Completing the description of the connection between the clutch pedal 18 and the clutch, a lower arm 38 of said pedal is connected, by a lost motion connection 40, to a rod 42; and the latter rod is fixedly connected to the lower arm of a two-armed crank 44 which is fixedly connected to the shaft 26. To a pin 39 extending laterally from the upper end of the crank 44 there is connected one end of an over-center spring 46 the lower end of which is connected to a bracket 48; and a clutch pedal return spring 51 is connected at one end to the bracket 48 and at its other end to the lower end of the arm 38 of the clutch pedal.

There is thus provided manually and power operated means for operating the clutch, the clutch pedal 18, by virtue of the operation of the lost motion connection 40, remaining stationary when the motor 32 is energized to disengage the clutch and the motor piston 34 remaining stationary when the clutch is disengaged by a manual operation of the clutch pedal. The latter operation is effected by virtue of the lost motion connection between the pin 39 and the crank 30.

Describing now the connection between the motor 32 and the transmission operated crank 14, as is described above, the piston operated rod 36 is connected to the crank 30; and the latter, when rotated, serves to rotate the shaft 27. A crank 52, Figure 7, is fixedly secured to the shaft 27 and said crank is yieldingly connected to one arm of a two-armed crank 54 by means including a two-diametered rod 56 pivotally connected at one of its ends by a yoke member to the upper end of the crank 52 and at its other end slidable through a trunnion block 58 pivotally mounted on the aforementioned arm of the crank 54; and a spring 60, sleeved over the rod 56 and positioned between the block 58 and the aforementioned yoke member, is compressed when the crank 52 is rotated counterclockwise, Figures 1 and 7, in the operation of the motor 32 in disengaging the clutch and operating the transmission. To the other arm of the two-armed crank 54 there is pivotally connected a dashpot 61 the stationary part of which is connected to the chassis of the vehicle by a bracket 62.

The two-armed crank 54 constitutes a part of an alternator 64, that is direction changing mechanism, one embodiment of such a mechanism being disclosed in detail in the Earl R. Price U. S. application for patent, No. 779,164, filed October 10, 1947. The alternator mechanism 64 of itself constitutes no part of my invention accordingly details to this mechanism are not shown in the instant application. The crank 54 is secured to an input lever or its equivalent within the alternator unit and an output lever or its equivalent within said unit is secured to a crank 81. The crank 81 is in turn connected to the transmission operating crank 14 by means including a two-armed idler lever 83 mounted on the chassis. One arm of the idler lever 83 is pivotally connected to the lower end of the crank 81 by a rod 93, and said arm is connected to the crank 14 by a rod 96.

As will be explained in greater detail hereinafter, when the motor 32 is de-energized a return spring 50 therein aided by the over-center spring 46 and the springs of the friction clutch, not shown, operate the preselecting mechanism of the alternator to prepare for the next operation of the transmission, that is, either a second gear or a high gear operation thereof.

There is thus provided, by the alternator 64, a mechanism for effecting a reciprocatory angular movement of the transmission operating crank 14 to alternately establish the transmission in its second and high gear settings, this operation being effected by an operation of the single acting motor 32.

Describing now the manually operated means for operating the crank 14, a gearshift lever 114, mounted beneath the steering wheel 116 of the car, is operably connected to one of the arms of the idler lever 83 by means including a rod 118. One end of the rod 118 is adjustably connected, by means including a bolt 120, Figure 6, to a crank arm 122 fixedly secured to a shaft 124. As disclosed in Figure 14, a lever 126, pivotally mounted on a pin 128, is connected at its upper end to the lower end of the shaft 124; and said pin is preferably mounted in a bracket 129. A trunnion block 130, extending laterally from and fixedly secured to one of the arms of the lever 126, is provided with an opening to receive one end of a rod 132; and a spring 134, sleeved over the rod 132 and positioned between the block 130 and a flange 136 fixed to the rod 132, provides a yieldable connection between the lever 126 and the cross-shift operating crank 12 of the transmission mechanism. The gearshift lever 114 is so connected to the shaft 124 that angular movement of said lever in a plane perpendicular to the plane of the steering wheel serves to bodily move said shaft upwardly against the tension of a cross shift return spring 138; and angular movement of the shift lever in a plane parallel to the plane of the steering wheel serves to rotate the shaft 124 about its axis to effect an angular movement of the crank 122. The latter movement serves to move the rod 118 to establish the transmission in gear.

The upward, that is cross-shift movement of the shaft 124 serves to rotate the lever 126 in a clockwise direction, Figure 6, and in this operation the trunnion block 130 abuts a nut 139 threadedly mounted on the end of the rod 132. The latter rod is thus moved to effect what is known as the cross-shift that is rail selecting operation of the transmission. Should the driver release the shift lever 114 after having completed this cross-shift operation then the spring 138, which is stronger than the spring 134, serves to return the lever 126 to its former position. In this operation the rod 132 remains in its cross-shift position and the spring 134 is compressed. The spring 138 is positioned between the hub of the crank 122 and a flange 140 the latter being fixedly secured to the steering column 142.

There is thus provided means for effecting a manual operation of the transmission; however it is to be noted that no claim is made to the force transmitting means interconnecting the shift lever 114 with the transmission operating means 118 and 132; for said mechanism is standard equipment of certain of the 1946 cars of the day.

The electrical means for controlling the operation of the three way valve operating solenoid 121 constitutes one of the features of my invention, said electrical means being disclosed in Figure 2. Describing this control means the movable contact 147 of a single pole double throw switch 143, Figure 3, operated by a vehicle speed responsive centrifugally operated governor 145, is electrically connected in series with a breaker switch 146 actuated by the input lever 54 of the alternator 64, a normally open breaker switch 95 which is closed by the accelerator when the same is released, a clutch pedal operated breaker switch 146'; a normally closed switch 111 preferably mounted on the back of the instrument panel of the vehicle, the ignition switch 150 of the car, and a grounded battery 151. The switch 146 is connected with the lever 54 by force transmitting means including a lost motion connection 198. A switch 147, 157 of the governor switch 143 is closed, to effect a low gear operation of the transmission, when the vehicle is at a standstill or is traveling below a certain speed; and a switch 147, 159 is closed, to effect a high gear setting of the transmission, when the vehicle is traveling at or above the aforementioned speed, that is above governor speed.

Referring to Figure 1, the wiring interconnecting the aforementioned switches and battery preferably includes a conductor 149 interconnecting the battery 151 with the ignition switch 150, a conductor 153 interconnecting the switch 111 with the switch 150, a conductor 154 interconnecting the latter switch with the accelerator operated switch 95, a conductor 155 interconnecting the latter switch with the switch 146, and a conductor 157' interconnecting the latter switch with the movable contact 147 of the governor operated switch 143. The fixed contacts 157 and 159 of the latter switch are connected respectively, by wires 161 and 163, to fixed contacts 165 and 167 of a selector switch mechanism 169 operated by the motor 32. To one end of the movable contact 171 of the switch mechanism 169 there is pivotally connected a link 173 which is pivotally connected to the motor operated transmission operating crank 14, Figure 1. The movable contact 171 is electrically connected to the grounded solenoid 121 by a contact 175 and a conductor 177. A fixed contact 179 of the switch mechanism 169 is electrically connected to a motor operated breaker switch 181 by a conductor 182; and the latter switch is electrically connected to the clutch pedal operator switch 146' by a conductor 183 and a part of the conductor 154.

Contacts 165 and 171, contacts 171 and 179 and contacts 167 and 171 of the selector switch mechanism 169, provide three separate switches, two of which are in series with the governor operated switch 143 and the third, that is, the switch 171, 179, being in series with a breaker switch 181; and the movable contact 171 is so connected with the transmission operating crank 14 and said switch mechanism is so constructed, that the switch 167, 171 is closed when the transmission is established in its second gear setting, the switch 165, 171 is closed when the transmission is established in its high gear setting, and the switch 171, 179 is at all times closed except when the transmission is completely or substantially completely established in either its second gear setting or its high gear setting. The breaker switch 181 is actuated by the piston 34 of the motor 32 and is made at all times except when said piston is in its released, that is, clutch engaged position; the breaker switch 146 is made when the alternator 64 is in its released that is pre-selecting position and is broken in all other positions of the alternator mechanism; and the clutch operated breaker switch 146' is broken when the clutch pedal is completely or substantially completely depressed to disengage the clutch and is made when the clutch pedal is in its clutch released position.

Describing now the operation of the mechanism thus far described, it will be assumed that the vehicle is at a standstill and that the engine is idling; and under these conditions the transmission will be established in its second gear setting. Explaining the operation of the mechanism to effect this setting, the switches 150, 111, 146', 95, 146, the switch 165, 171, and the governor operated switch 147, 157, of Figure 2 are closed as the vehicle is being decelerated to a stop, accordingly the solenoid 121 is energized to open the three way valve 33; and the results in an energization of the motor 32 to effect the second gear setting of the transmission, the electrical circuit including said switches being automatically opened, by the opening of either the switch 171, 179 or the switch 146, at the time the setting of the transmission is effected.

Explaining this operation in greater detail it is to be remembered that the selector switch 165, 171 is closed when the transmission is established in its high gear setting this operation being effected to prepare the mechanism for a low gear setting of the mechanism; and it is also to be remembered that the alternator operated switch 146 is closed prior to an operation of the motor 32, and that the governor switch 147, 157 is automatically closed, to initiate the second gear operation of the mechanism, when the speed of the vehicle is brought down to a certain factor.

With the opening of the latter circuit the piston 34 returns to its clutch engaged, that is, released position; and with this operation the switch 181 is opened, the switches 146 and 167, 171 are closed, and the alternator mechanism is returned to its preselecting position. The mechanism is then prepared for a subsequent power operated high gear operation of the transmission. As to above described second gear operation of the mechanism, it is to be remembered that the clutch is operated to facilitate the operation of the transmission.

The transmission being established in its second gear setting, the driver, to get the vehicle under way, will then depress the accelerator; and this operation in getting the vehicle underway in second gear is facilitated by the operation of the fluid coupling of the power plant. When the speed of the vehicle exceeds governor speed the switch 147, 159 will be automatically closed and then when the accelerator is then released to close the switch 95 there will be effected another energization of the motor 32 to successively effect a disengagement of the clutch and a high gear setting of the transmission.

As the high gear setting of the transmission is being completed the switches 146 and 171, 179 are open thereby again initiating the return of the piston 34 to its released position; and it is to be remembered that during the high gear operation of the mechanism should the driver suddenly decelerate the car sufficiently to close the switch 147, 157 then after the high gear operation of the transmission is completed, and assuming the accelerator operated switch 95 to remain closed, the mechanism will be automatically operated to establish the transmission in its second gear setting. This operation is made possible by the operation of the switch 146 which is automatically closed when the de-energization of the motor 32 is completed.

Assuming that the clutch pedal is not depressed to open the switch 146', the transmission will then be shuttled back and forth between its second and high gear settings depending upon the speed of the vehicle, the clutch being operated to facilitate these power operations of the mechanism. In this shuttling operation one of the other of the motor operated selector switches 167, 171 and 165, 171 is made just as the transmission is being established in gear thereby preparing the mechanism for a subsequent operation of the transmission; and said operation is then initiated by the operation of the governor switch 143 and a release of the accelerator to close the switch 95.

Should the driver at any time desire to overrule the automatic power operation of the mechanism and operate said mechanism manually he need but press the clutch pedal sufficiently to open the switch 146' thereby disabling the power means. Duplicating the operation of the alternator operation switch 146 the switch 146' is closed by the depression of the clutch pedal only during the last increment of the depressing operation. A manual operation of the shift lever 114 then serves to establish the transmission in the desired setting. The transmission may also be successively manually operated between its reverse gear setting and one or the other of the low and high gear settings.

Reviewing other features of my invention, the operation of the switch 171, 179 serves to insure the clutch disengaging and transmission operating operation of the motor 32 once initiated and despite an opening of the accelerator operated switch 95 during said operation; the motor operated switch 181 serves to open the electrical circuit including the switch 171, 179 when the operation of the transmission is completed thereby preventing an undesired power operation of the transmission should the latter slip out of gear and close the switch 171, 179; the dash mounted cut-out switch 111 may be opened at will thereby disabling the power means of the invention; the alternator operated switch 146 serves to insure a recycle second gear operation of the transmission if this operation is called for by the governor operated switch 143; and the construction and operation of the clutch operated switch 146', including a lost motion connection 199' duplicating the connection 198, is such that the operation of the motor 32, to effect the operation of the transmission and clutch, is completed prior to the opening of said switch 146'.

Describing now the principal feature of my invention there is provided means, operative at the will of the driver, for overruling the above described operation of the power means of my invention whereby the transmission may, by a depression of the accelerator beyond its wide open throttle position, be established in its second gear setting when the vehicle is traveling above governor speed. Such a mechanism enables the driver to appreciably accelerate the car to pass another car on the road; and this mechanism also makes possible a quick shift of the transmission from high to second when the vehicle is climbing a hill.

To accomplish this end there is provided a spring and vacuum operated kick down motor 28 disclosed in detail in Figure 4 of the drawings. This motor includes a casing 55 housing a piston 57 the latter being connected with the transmission operating crank 14 by a rod 59. At its end the rod 59 is slidably mounted within a trunnion nut 66 secured to the end of the crank 14; and a flange 68 secured to the rod contacts the nut when the rod is moved to the left, Figure 1. There is thus provided a one way connection between the motor 28 and the crank 14.

The motor 28 includes a spring 72 operative to bias the piston 57 to the left, Figure 4, to its second gear position. In other words the spring effects the above described leftward movement of the rod 59; and a grounded electromagnet 73 operating as a holding coil serves, when energized, to hold the piston in its up-shift, that is off position when the motor 28 is vacuum energized. An ignition controlling switch 74, including a yieldable movable contact 77 which is grounded and a fixed contact 79, is also mounted within the motor 28 the operation of said switch being referred to hereinafter.

The motor 28 is controlled by a three way valve 75 which is disclosed in detail in Figure 5 said valve including a casing 84 and a valve member 85 therein, said member being connected to the armature 86 of a solenoid 88. Energization of the solenoid 88 serves to seat the valve 85 at 89 thereby connecting a control compartment 90 of the motor 28 with the intake manifold of the engine of the vehicle via conduits 91 and 92, the former being connected to the manifold and the latter to the motor. De-energization of the solenoid 88 results in a spring 98 serving to seat the valve member 85 at 94 thereby venting the control compartment 90 to the atmosphere via a port 97 in the casing 84 and the conduit 92.

As is disclosed in Figure 2 the solenoid 88 and the grounded electromagnet 73 which is in series with the solenoid, are controlled by a normally closed accelerator operated breaker switch 99 which is opened only when the accelerator is depressed past its wide open throttle position; and this breaker switch is electrically connected to the ignition switch 150.

There is thus provided electrical means for controlling the operation of the valve operating solenoid 88 the latter being normally energized to effect a vacuum operation of the three way valve 75, that is, an operation to vacuum energize the kickdown motor 28 to move the rod 59 to the right and out of the way of the transmission operating crank 14; and when the accelerator is depressed past its wide open throttle position to effect a kickdown, that is, second gear operation of the motor 28 then the switch 99 is broken thereby effecting a de-energization of the solenoid 88. This operation in turn effects a closing operation of the valve 75 whereby the control compartment 90 of the motor 28 is vented to the atmosphere; and this operation makes possible an expansion of the spring 72 to effect a movement of the rod 59 to the left, Figure 1, to rotate the crank 14 to establish the transmission in its second gear setting.

This second gear, that is, kickdown operation of the mechanism is facilitated by a momentary disabling of the ignition system of the engine; for from an inspection of Figures 1 and 2 it will be noted that the grounded switch 74 is closed when the piston 57 is in its vacuum operated position and said switch is electrically connected in series with both a normally open accelerator operated breaker switch 101 and with the primary winding 103 of the ignition coil 113 of the ignition system of the vehicle. The latter switch is closed when the accelerator is depressed past its wide open throttle position, said operation being effected simultaneously or substantially simultaneously with the opening of the switch 99; and when the switch 101 is closed the ignition is disabled by virtue of the grounding of the primary winding of the ignition coil. However this disabling operation is only momentary inasmuch as the switch 74 is automatically opened after a relatively short movement of the rod 59 to the left, Figure 1. This delayed opening of the switch 74 is effected by means of a yieldable lost motion connection 123, a spring 106 of said connection being weaker than the yieldable switch contact 77 in series therewith.

There is thus provided, by the ignition interrupter switch 74 and cooperating switch mechanism, means for momentarily disabling the ignition system of the power plant of the vehicle thereby reversing the torque of the engine; and this operation facilitates the spring operated second gear, that is, kick down operation of the motor 28.

There is thus provided, by the latter motor, power means for effecting a second gear operation of the transmission when the driver tramps upon the accelerator pedal to pass a car on the road; for with this operation the three way valve 75 is operated to make possible a spring energization of the motor 28, the holding coil 73 being automatically de-energized to make this operation possible. It is to be noted that there is no operation of the friction clutch in effecting this kick down operation of the mechanism; for the temporary disabling of the ignition system of the engine makes this operation unnecessary.

The second gear setting of the transmission having been effected and the desired operation of the car completed, the driver will then probably wish to re-establish the third gear setting of the transmission; and this is effected merely by releasing the accelerator to close the switch 95 thereby initiating an operation of the motor 32 to again establish the transmission in its high gear setting. It is to be noted here that no claim is made to the kick down motor 28 and its associated ignition interrupter mechanism inasmuch as the same is disclosed in the Neracher et al. U. S. application No. 272,734, filed May 9, 1939.

Now it will be noted from an inspection of the mechanism of Figure 1 of the drawings that it is desirable to move the rod 59 out of the way of the crank 14 when the driver is manually operating the transmission or when the transmission is established in its second gear setting; for otherwise said rod and the piston 57 connected therewith would interfere with the angular movement of the crank 14 in the operation of effecting the high gear setting of the transmission. It is also desirable to disable the kickdown motor 28 when the vehicle is traveling at a relatively high speed; for if the kickdown operation were effected at a high vehicle speed there would result an undesirable de-celeration of the vehicle by virtue of the picking up of the load of the engine after the second gear setting of the transmission is completed and the operation of the ignition system is resumed.

To obviate the above described undesirable features of the mechanism there are provided three breaker switches 115, 117 and 119, the switches 115 and 117 being preferably connected in parallel with the accelerator operated switch 99 and the switch 119 being independent of the switches 115 and 117. As is disclosed in Figure 1, the breaker switch 117 is operated by the transmission operated crank 14, the construction of the switch and its connection with said crank being such that the switch is opened when the transmission is established in its third gear setting and is closed at all other times in the operation of the mechanism. The breaker switch 115 is normally closed by the operation of a spring 127; and said switch is preferably opened by a fan member the operation being such that when the vehicle is traveling at or above a certain speed the air pressure to which the fan is subjected results in an operation of a lever 123 to close said switch. As to the breaker switch 119 this switch is closed when the driver actuates a dash mounted rod 105, the aforementioned switch 111 being opened when the switch 119 is closed; and this switch operation serves to disable both motors 28 and 32 thereby preparing the mechanism for its operation by the physical effort of the driver.

There is thus provided, by the switches 115, 117 and 119, means for improving the operation of the mechanism of my invention by disabling the motor 28 under certain conditions of operation of the mechanism; for when any one of these three switches are closed the motor 28 is vacuum energized thereby moving the rod 59 out of the way of the crank 14 and rendering the accelerator operated switch 99 inoperative to effect the kickdown operation of the motor.

There is thus provided a simple, compact and easily serviced combined manually and power operated mechanism for operating a three speeds forward and reverse transmission of an automotive vehicle. The selector switch mechanism 169, including the selector switches 167, 171 and 165, 171 and the series connected governor operated switch 143, cooperate to effect a control of the vacuum motor 32 to shuttle the transmission back and forth between its second and high gear settings the clutch being operated to facilitate this operation of the transmission. The driver may, simply by depressing the clutch pedal sufficiently to open the switch 146', overrule, that is, disable the power means of the mechanism of my invention; and having so overruled the power means he may then operate the transmission in the conventional manner, that is, he may establish the transmission in any one of its settings by the usual operation of the shift lever 114. This part of the mechanism of my invention, that is the power means for effecting the second and high gear shuttling operation of the transmission and the manual operation of the mechanism to overrule this power means, is disclosed in the aforementioned application of Earl R. Price, No. 779,164, filed October 10, 1947, accordingly the essence of the invention of the instant application lies in a new combination of elements providing a new shifter mechanism said combination consisting of the mechanism of the aforementioned Price application improved by the addition of the kickdown motor 28 and the cooperating ignition controlling mechanism. However as set forth in the objects of my invention the kickdown motor and the cooperating ignition controlling mechanism may also be combined with a power operated two speed axle mechanism.

Although only one embodiment of the invention has been illustrated and described, various changes in the form and relative arrangements of the parts may be made to suit requirements.

I claim:

1. Control means adapted to control the operation of the change speed transmission of the power plant of an automotive vehicle, said plant comprising a throttle controlling accelerator, said control means including a fluid pressure motor adapted to be connected to the transmission and operable to establish the transmission either in a relatively high gear ratio setting or a relatively low ratio gear setting, valve means for controlling the operation of said motor, means, including speed responsive means, for controlling the operation of the valve means to effect one or the other of the aforementioned two settings of the transmission depending upon the speed of the vehicle, power means, operable at the will of the driver of the vehicle, to overrule the motor to establish the transmission in its relatively low gear ratio setting, and means including accelerator operated means, for controlling the operation of the latter power means.

2. Control means adapted to control the operation of the change speed transmission of the power plant of an automotive vehicle including a single acting fluid pressure motor adapted to be connected to the transmission and operable to establish the same either in a relatively high gear ratio setting or a relatively low gear ratio setting, valve means for controlling the operation of said motor, means, including speed responsive means and a direction changing means, for controlling the operation of the valve means and motor to effect one or the other of the two aforementioned settings of the transmission depending upon the speed of the vehicle; power means, operable at the will of the driver of the vehicle, for establishing the transmission in its relatively low gear ratio setting, and means, including an accelerator operated means, for controlling the operation of the latter power means.

3. Control means adapted to control the operation of a change speed transmission of an automotive vehicle including a single acting pressure differential operated motor, direction changing means adapted to connect the motor with the transmission, said means being operative to successively effect first one and then the other of two settings of the transmission, valve means for controlling the operation of said motor, means, including a vehicle speed responsive governor operated means, for controlling the operation of the valve means, another motor, operative at the will of the driver, for effecting one of the aforementioned two settings of the transmission despite the speed of the vehicle, and means for controlling the operation of the latter motor.

4. Control means adapted to control the operation of a change speed transmission and a friction clutch of the power plant of an automotive vehicle, said plant including a throttle controlling accelerator, said control means including a single acting pressure differential operated motor, direction changing means adapted to connect the motor with the transmission said means being operative to successively effect first one and then the other of two settings of the transmission, valve means for controlling the operation of said motor, means, including a vehicle speed responsive governor operated means, for controlling the operation of the valve means; another motor, operable at the will of the driver, for effecting one of the aforementioned two settings of the transmission and thereby overrule the operation of the aforementioned motor, and means, including an accelerator operated switch, for controlling the operation of the latter motor.

5. In an automotive vehicle provided with a change speed transmission and an accelerator, manually and power operated means for operating the transmission to establish one or the other of two of its settings including a single acting motor, force transmitting means, including a direction changing mechanism, interconnecting the motor with the transmission and operative to effect first one and then the other of two settings of the transmission, valve means for controlling the operation of said motor, means, including a vehicle speed responsive governor for controlling the operation of the valve means thereby providing means, operative in accordance with the speed of the vehicle for effecting one of the settings of the transmission when the vehicle speed is at or above a certain factor and for effecting the other of the settings of the transmission when the vehicle speed is at or below a certain factor; power means operable at the will of the driver of the vehicle to effect one of the aforementioned settings of the transmission and thereby overrule the operation of the aforementioned motor, and means, including an accelerator operated switch means, for controlling the operation of the latter power means.

6. In an automotive vehicle provided with a change speed transmission and an accelerator, manually and power operated means for operating the transmission to establish one or the other of two of its settings including a single acting motor, force transmitting means, including a direction changing mechanism, interconnecting the motor with the transmission and operative to effect first one and then the other of two settings thereof, valve means, including a three way valve, for controlling the operation of said motor, means, including a vehicle speed responsive governor operated switch and a transmission operated selector switch, for controlling the operation of the valve means thereby providing means, operative in accordance with the speed of the vehicle for effecting one of the aforementioned two settings of the transmission when the vehicle speed is at or above a certain factor and for effecting the other of the aforementioned two settings of the transmission when the vehicle speed is at or below a certain factor, power means, including a spring and vacuum operated motor, operable at the will of the driver of the vehicle to effect one of the aforementioned two settings of the transmission, and means, including an accelerator operated switch means, for controlling the operation of the latter power means.

7. In an automotive vehicle provided with a change speed transmission and an accelerator, power means for operating the transmission including a pressure differential operated motor, means for controlling the operation of said motor to effect one setting of the transmission when the vehicle speed is reduced to or below a certain factor and to effect another setting of the transmission when the vehicle speed is at or above a certain factor, power means for overruling the aforementioned power means to establish the transmission in one of the aforementioned two settings, and means, controlled in part by the accelerator, for controlling the operation of the latter power means.

8. In an automotive vehicle provided with a change speed transmission and an accelerator, power means for operating the transmission including a single acting pressure differential operated motor, means for controlling the operation of said motor to effect one setting of the transmission when the vehicle speed is reduced to or below a certain factor and to effect another setting of the transmission when the vehicle speed is at or above a certain factor, power means, including a spring and vacuum operated motor, for overruling the aforementioned power means to establish the transmission in one of the aforementioned settings, and means, controlled in part by the accelerator, for controlling the operation of the latter power means.

9. Control means adapted to control the operation of the change speed transmission of the power plant of an automotive vehicle said plant being provided with an accelerator, said means comprising a single acting pressure differential operated motor operably connected to the transmission, valve means for controlling the operation of said motor, electrical means for controlling the operation of the valve means to successively effect an energization and a de-energization of the motor including, in series, a source of electrical energy, an accelerator operated switch, a valve operating solenoid, a motor operated selector switch mechanism, a governor operated single pole double throw selector switch mechanism, and a clutch pedal operated switch which is opened only when the clutch pedal is depressed a predetermined amount; together with power means for overruling the operation of the motor to effect, at the will of the driver of the vehicle, a certain operation of the transmission, said power means including a motor, and means, including an accelerator operated switch for controlling the operation of the latter motor.

10. Control means adapted to control the operation of the change speed transmission of the power plant of an automotive vehicle which is provided with an accelerator, said means comprising a single acting pressure differential operated motor operably connected to the transmission, valve means for controlling the operation of said motor, electrical means for controlling the operation of the valve means to successively effect an energization and a deenergization of the motor including, in series, a source of electrical energy, an accelerator operated switch, a valve operating solenoid, a motor operated selector switch mechanism including three switches one of which is electrically connected to the source of electrical energy by electrical means which is shunted around the accelerator switch, a governor operated single pole double throw selector switch mechanism, and a clutch pedal operated switch which is opened only when the clutch pedal is depressed a predetermined amount; together with power means, operative at the will of the driver of the vehicle, for overruling the operation of the motor by effecting a certain setting of the transmission.

11. Power operated means for effecting a reciprocatory movement of a crank including a fluid pressure motor, valve means for controlling the operation of said motor, means for controlling the operation of the valve means including, in series, a manually operated switch mechanism and a selector switch mechanism operated by the motor; together with means, including a motor, operable to overrule the aforementioned mechanism by effecting, at the will of the operator of the mechanism, a rotation of the crank in one direction.

12. Power operated means for effecting a reciprocatory movement of a crank including a single acting fluid pressure motor, force transmitting means, including a direction changing mechanism, adapted to connect the motor with the crank, valve means for controlling the operation of said motor, means for controlling the operation of the valve means including in series, a manually operated switch, a governor operated switch mechanism and a selector switch mechanism operated by the motor; together with means, including a motor, operable to overrule the aforementioned mechanism by effecting, at the will of the operator of the mechanism, a rotation of the crank in one direction.

13. In an automotive vehicle provided with a power plant including a three speeds forward and reverse transmission, an engine controlling ignition system, a gear shift lever and an accelerator; manually and power operated means for operating the transmission including a single acting pressure differential operated motor, force transmitting means, including a direction changing mechanism, interconnecting the power element of the motor and the transmission and operative to effect an operation of the transmission; manually operated force transmitting means interconnecting the shift lever and a part of the aforementioned force transmitting mechanism, valve means for controlling the operation of the motor, electrical means for controlling the operation of the valve means to successively effect an energization and a de-energization of the motor; together with an accelerator controlled power means for overruling the operation of the motor, by effecting, at the will of the driver of the vehicle, a certain operation of the transmission, the ignition system being momentarily disabled to facilitate said operation of the transmission.

14. In an automotive vehicle provided with a three speeds forward and reverse transmission, a gear shift lever and a friction clutch; manually and power operated means for operating the transmission and clutch including a pressure differential operated motor, force transmitting means interconnecting the clutch, the transmission and the motor, force transmitting means interconnecting the gear shift lever with that portion of the aforementioned force transmitting means directly connected to the transmission and operable to effect a manual operation of the transmission, valve means for controlling the operation of the motor, means, including a cutout switch, for controlling the operation of the valve means; power means operable to overrule the operation of the aforementioned motor to effect a second gear operation of the transmission, and means, including a switch operable with an operation of the cutout switch, for disabling the power means, said disabling operation being effected to prepare the mechanism for a manual operation of the transmission.

15. A mechanism for operating a change speed transmission of an automotive vehicle said transmission including an angularly movable crank movable to one position to effect one setting of the transmission and to another position to effect another setting of the transmission, said mechanism including a motor, force transmitting means interconnecting the motor and crank, valve means for controlling the operation of the motor, means, including a speed responsive means, for controlling the operation of the valve means to effect first one and then the other of the transmission operating operations of the crank, another transmission operating motor operable to effect, at the will of the operator of the mechanism, one of the transmission operating operations of the crank, said operation being effected irrespective of the speed of the vehicle, valve means for controlling the operation of the latter motor, means, including an accelerator operated switch mechanism, for controlling the operation of the latter motor, and switch means operative to control the latter valve means to disable the operation of the latter motor.

16. Power and manually operated means adapted to operate the change speed transmission of the power plant of an automotive vehicle including a motor, force transmitting means adapted to connect the motor with the transmission, manually operated force transmitting means adapted to operate the transmission when the motor is disabled, valve means for controlling the operation of the motor, another motor for effecting a certain operation of the transmission, valve means for controlling the operation of the latter motor, and means for controlling the operation of both of said valve means including a manually operated switch mechanism operative to disable both of said motors in preparation for a manual operation of the mechanism.

17. Power and manually operated means adapted to operate the change speed transmission of the power plant of an automotive vehicle including a single acting motor, force transmitting means, including a direction changing mechanism, adapted to connect the motor with the transmission, manually operated force transmitting means adapted to operate the transmission when the motor is disabled, valve means for controlling the operation of the motor, another motor operative to overrule the operation of the aforementioned motor for effecting, at the will of the operator of the mechanism, a certain operation of the transmission, valve means for controlling the operation of the latter motor, and means for controlling the operation of both of said valve means including a manually operated switch mechanism operative to disable both of said motors in preparation for a manual operation of the mechanism.

18. Manually and power operated mechanism for operating a change speed transmission of the power plant of an automotive vehicle including a gear shift lever; said mechanism including a motor, force transmitting means, including a direction changing mechanism, interconnecting the motor and transmission, other force transmitting means interconnecting the gear shift lever with that portion of the aforementioned force transmitting means interconnecting the direction changing mechanism and transmission, valve means for controlling the operation of the motor, means, including a vehicle speed responsive means, for controlling the operation of the valve means to effect a shuttling operation of the transmission between two of its settings, another motor operative to overrule the aforementioned motor by effecting, at the will of the operator of the mechanism, one of the aforementioned two settings of the transmission, valve means for controlling the operation of the latter motor, means for controlling the operation of the latter valve means, and manually operated means for disabling the operation of both of said motors in the operation of preparing the mechanism for a manual operation thereof.

RICHARD H. LONG.

REFERENCES CITED

The following references are of record in the file of this patent:

UNITED STATES PATENTS

| Number | Name | Date |
|---|---|---|
| 2,292,325 | Lawler | Aug. 4, 1942 |
| 2,322,479 | Schjolin | June 22, 1943 |
| 2,328,921 | Neff | Sept. 7, 1943 |
| 2,332,341 | Price et al. | Oct. 19, 1943 |